United States Patent
Chaudhari et al.

(10) Patent No.: US 12,334,612 B2
(45) Date of Patent: Jun. 17, 2025

(54) METHOD AND A DEVICE FOR OPERATING PEM FUEL CELL WITH CO CONTAMINATED HYDROGEN GAS

(71) Applicant: Indian Oil Corporation Limited, Mumbai (IN)

(72) Inventors: Chinmay Chaudhari, Faridabad (IN); Sachin Chugh, Faridabad (IN); Meenakshi Sundarraman, Faridabad (IN); Kapil Sonkar, Faridabad (IN); Alok Sharma, Faridabad (IN); Gurpreet Singh Kapur, Faridabad (IN); Sankara Sri Venkata Ramakumar, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 789 days.

(21) Appl. No.: 17/330,688

(22) Filed: May 26, 2021

(65) Prior Publication Data

US 2021/0376363 A1    Dec. 2, 2021

(30) Foreign Application Priority Data

May 26, 2020    (IN) .............................. 202021021946

(51) Int. Cl.
*H01M 8/06*    (2016.01)
*B01D 53/86*    (2006.01)
(Continued)

(52) U.S. Cl.
CPC ........ *H01M 8/0681* (2013.01); *B01D 53/864* (2013.01); *B01D 53/96* (2013.01);
(Continued)

(58) Field of Classification Search
CPC ............. H01M 8/0681; H01M 8/0668; H01M 8/0687; B01D 53/864; B01D 53/96; C01B 3/56; C01B 2210/0014
See application file for complete search history.

(56) References Cited

U.S. PATENT DOCUMENTS

| | | | |
|---|---|---|---|
| 6,245,214 B1 * | 6/2001 | Rehg ................... | H01M 8/0662 205/763 |
| 6,517,963 B2 * | 2/2003 | Lakshmanan .......... | H01M 4/96 429/432 |

(Continued)

FOREIGN PATENT DOCUMENTS

CN    109499261 A    3/2019

OTHER PUBLICATIONS

Huang, Cunping, On-board removal of CO and other impurities in hydrogen for PEM fuel cell applications, Journal of Power Sources, Aug. 22, 2006, 563-571, 162, Elsevier, Cocoa, Florida.

*Primary Examiner* — Zulmariam Mendez
(74) *Attorney, Agent, or Firm* — Workman Nydegger

(57) ABSTRACT

An apparatus for purifying impure hydrogen fuel is described that includes a first chamber and a second chamber. The first chamber is configured to receive impure hydrogen fuel in the form of a first mixture of gases with hydrogen gas and carbon monoxide at the first concentration while the second chamber is configured to receive a second mixture of gases with hydrogen gas at the second concentration. The apparatus also includes a solid-state electrolyte that separates the first chamber and the second chamber and includes an adsorbing catalyst. The apparatus also includes a pair of electrodes installed each in the first chamber and the second chamber to create a potential difference is created across the solid-state electrolyte.

8 Claims, 4 Drawing Sheets

(51) Int. Cl.
*B01D 53/96* (2006.01)
*C01B 3/56* (2006.01)
*H01M 8/0662* (2016.01)
*H01M 8/0668* (2016.01)

(52) U.S. Cl.
CPC ............ *C01B 3/56* (2013.01); *H01M 8/0668* (2013.01); *H01M 8/0687* (2013.01); *C01B 2210/0014* (2013.01)

(56) References Cited

U.S. PATENT DOCUMENTS

| | | |
|---|---|---|
| 7,524,344 B2 | 4/2009 | Gittleman et al. |
| 8,372,375 B2 | 2/2013 | Nakao et al. |
| 2018/0062186 A1* | 3/2018 | Jahnke .................... H01M 8/06 |

* cited by examiner

METHOD AND A DEVICE FOR OPERATING PEM FUEL CELL WITH CO CONTAMINATED HYDROGEN GAS

FIELD OF THE INVENTION

The present disclosure relates to system and method of removing carbon monoxide (CO) from fuel for a fuel cell.

BACKGROUND

Fuel cell is an electro-chemical device that generates electricity using hydrogen gas from a source and oxygen from the air. The fuel cell includes an anode that includes a catalyst which ionises the hydrogen gas resulting in the generation of free electrons. Similarly, a cathode of fuel cell creates a negative potential to drive the electrons from the anode to the cathode via an electrical circuit. The conventional fuel cell uses a Platinum catalyst-based anode to ionise hydrogen gas.

Fuel gas, such as synthetic gas or syngas is commonly used as the source of hydrogen gas. However, syngas includes carbon monoxide that combines with the catalyst on the anode resulting in a phenomenon called carbon monoxide poisoning. The poisoning reduces the performance of the catalyst, and consequently, the performance of the fuel cell. One way to mitigate the issue of poisoning is to operate the fuel cell at a higher temperature to inhibit the carbon monoxide from combining with the anode. However, operating the fuel cell at a higher temperature reduces the power output of the fuel cell. Another technique to mitigate the poisoning is to use purges of pure Hydrogen gas and Nitrogen or air on the anode to prevent carbon monoxide from combining with the anode. However, such a technique requires a constant supply of such gases thereby increasing the infrastructure and operating cost associated with the fuel cell. Moreover, use of such a technique also reduces an inflow of hydrogen gas that reacts with the anode thereby reducing both the efficiency and throughput of the fuel cell.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The present subject matter relates to the aspects of scrubbing carbon monoxide from a feed of impure hydrogen fuel by consuming less power while maintaining an adequate amount of hydrogen gas to the fuel cell. The aspects of the present subject matter can be applied to a new fuel cell or can be retrofitted to an existing fuel cell system.

In an embodiment, an assembly for a fuel cell is described. The assembly includes an apparatus and a buffer tank. The apparatus is configured to receive impure hydrogen fuel that includes hydrogen gas contaminated with carbon monoxide. The apparatus is configured to operate in two modes, namely the adsorption mode and the regeneration mode, to process the impure hydrogen fuel. In adsorption mode, the apparatus scrubs carbon monoxide from the impure hydrogen fuel and releases the remainder hydrogen gas. In regeneration mode, the catalyst with adsorbed carbon monoxide is regenerated and oxidized, and additional hydrogen gas is generated during regeneration which is extracted and stored for further use. The buffer tank is fluidly coupled to the apparatus, such that the buffer tank receives the hydrogen gas from the apparatus and feeds the hydrogen gas to a fuel cell. The buffer tank is configured in such a way that the buffer tank ensures a constant supply of hydrogen gas to the fuel cell when an output of the apparatus is reduced during the regeneration mode.

In an embodiment, the apparatus for the assembly is disclosed. The apparatus includes a housing that includes a first chamber and a second chamber. The first chamber is configured to receive impure hydrogen fuel in the form of a first mixture of gases with carbon monoxide and hydrogen gas at the first concentration while the second chamber is configured to receive a second mixture of gases with hydrogen gas at second concentration.

The apparatus also includes a solid-state electrolyte that separates the first chamber and the second chamber. The solid-state electrolyte includes a coating of carbon monoxide adsorbing catalyst. The solid-state electrolyte is configured to perform two tasks. First, the solid-state electrolyte may adsorb the carbon monoxide from the first mixture of gases and purifies the impure hydrogen fuel. Second, the solid-state electrolyte may regenerate the catalyst by desorbing the carbon monoxide, oxidizing the carbon monoxide, and generating additional hydrogen gas. The apparatus also includes a pair of electrodes installed each in the first chamber and the second chamber, such that a potential difference is created across the solid-state electrolyte when an electric potential is applied to the electrodes. The potential difference, when applied results in the regeneration of the catalyst.

According to the present subject matter, provisions of adsorbing the carbon monoxide from the impure hydrogen fuel ensures that the feed to the fuel cell does not corrode the fuel cell while supply of hydrogen gas is not reduced. Moreover, regenerating the catalyst that results in the generation of additional hydrogen gas may increase an overall throughput of the apparatus. Moreover, provision of adsorption and regeneration within the single housing also helps in achieving the compactness. In addition, the provision of the buffer tank also ensures an uninterrupted supply of hydrogen gas to the fuel cell thereby maintaining the power output of the fuel cell.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
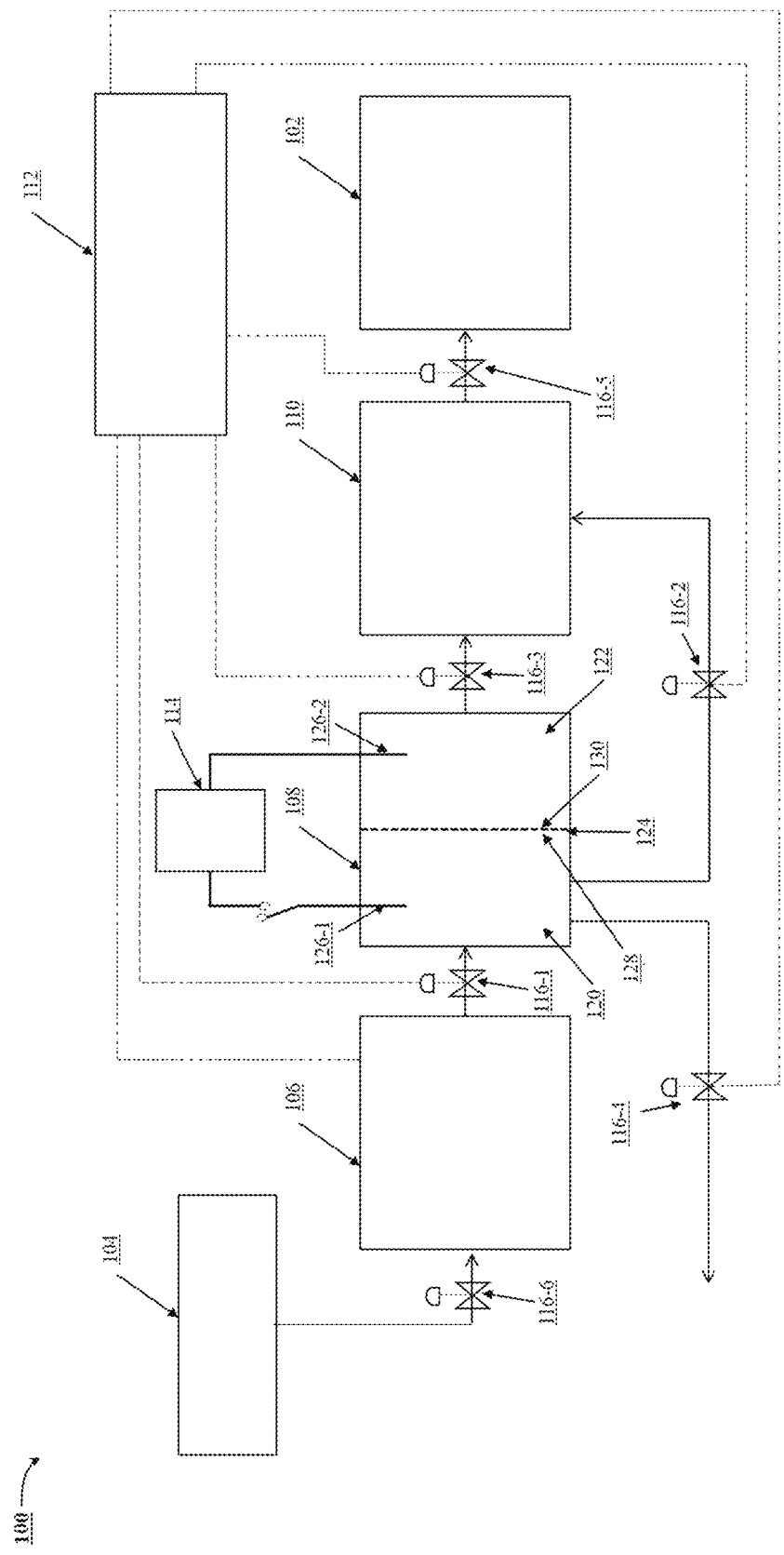
FIG. 1 illustrates a schematic view of an assembly for purifying impure hydrogen fuel, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skill in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of the present disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of the present disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

In an embodiment of the present subject matter, an apparatus for purifying impure hydrogen fuel is disclosed. The apparatus includes a housing that includes a first chamber and a second chamber that receives hydrogen gas at different concentrations, such that the concentration of hydrogen gas in the first chamber is less than the concentration of hydrogen gas in the second chamber. Further, the first chamber and the second chamber are fluidically coupled to the buffer tank in such a way that the first chamber and the second chamber may supply hydrogen gas to the buffer tank so that the buffer tank stores an adequate volume of hydrogen gas for an uninterrupted supply of hydrogen gas to the fuel cell.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Figure 2:
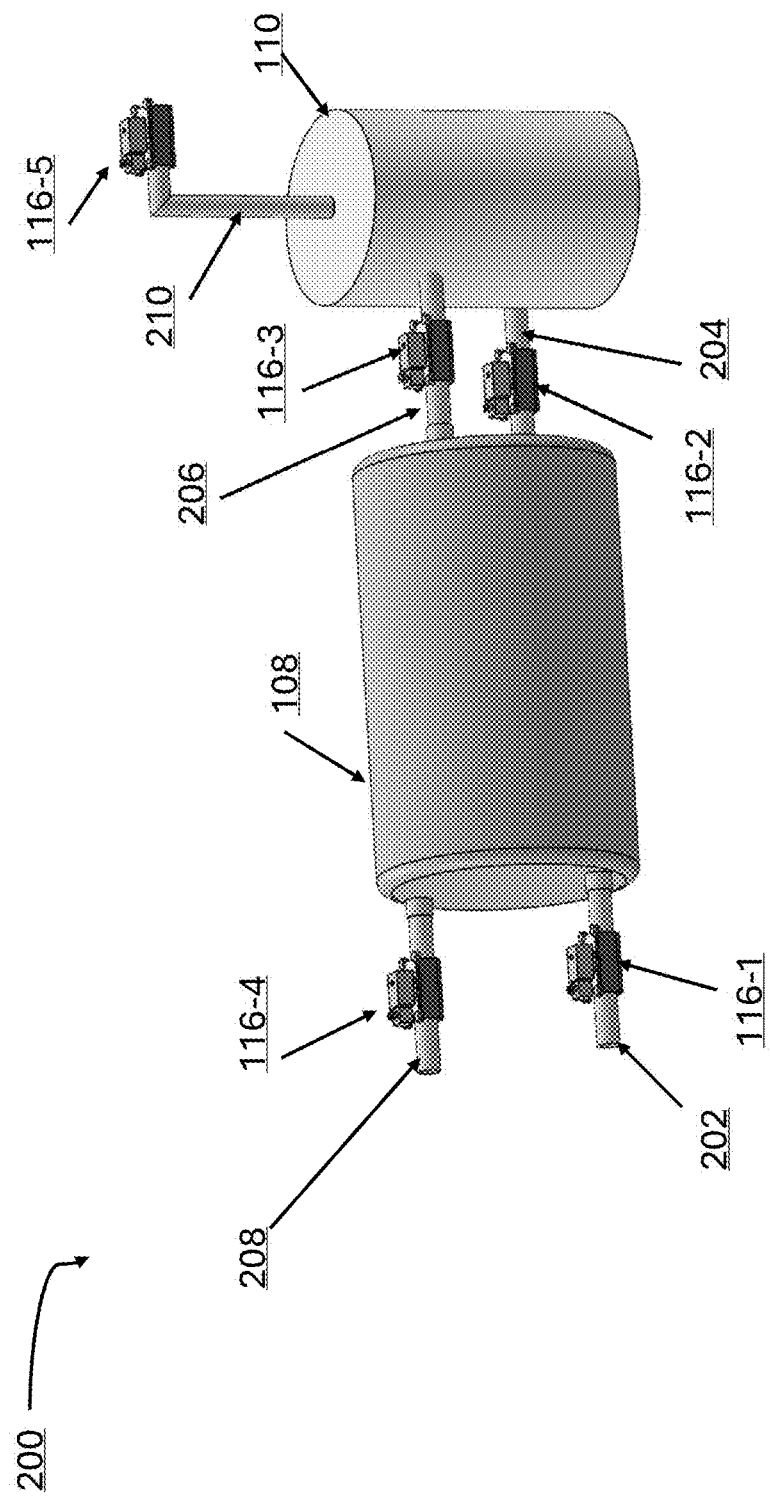
FIG. 2 illustrates a schematic view of an apparatus and a buffer tank for purifying impure hydrogen fuel, according to an embodiment of the present disclosure.

FIG. 1 illustrates a schematic view of an assembly 100 for purifying impure hydrogen fuel, according to an embodiment of the present disclosure. The assembly 100 is configured to supply hydrogen gas to a fuel cell or a stack 102 of fuel cells with a prerequisite concentration of hydrogen gas. The assembly 100 may include a source 104, a pre-treatment unit 106, an apparatus 108 for scrubbing carbon monoxide, and a buffer tank 110, a controller 112, and an electrical source 114. The assembly 100 may also include a plurality of valves 116-1, 116-2, 116-3, 116-4, 116-5, and 116-6, collectively referred to as 116 hereinafter. FIG. 2 illustrates a detailed schematic view 200 of apparatus 108 and the buffer tank 110 for purifying impure hydrogen fuel, according to an embodiment of the present disclosure. The apparatus 108 may include, but is not limited to, a housing 118 that includes a first chamber 120, a second chamber 122. The apparatus 108 may also include a solid-state electrolyte 124 and a pair of electrodes 126-1, 126-2. In one example, the electrode 126-1 is the anode while the cathode 126-2 is cathode.

In an embodiment, the source 104 is configured to supply impure hydrogen fuel. The impure hydrogen fuel can be understood as a mixture of gases that includes hydrogen gas and other gases that can reduce the performance of the fuel cell, for instance, by corroding the fuel cells in the fuel cell stack 102. Such gases can be, in one example, carbon monoxide. The assembly 100 is configured to remove carbon monoxide from the impure hydrogen fuel while ensuring no loss to the volume of hydrogen gas in the impure hydrogen fuel. The impure hydrogen fuel can be natural gas, synthetic natural gas, biomass gas, coal gas, among other examples. Such sources include carbon monoxide gas one of a component that corrodes the fuel cells in the fuel cell stack 102. In the illustrated example, a stream of the impure hydrogen fuel from the source 104 may be termed as a first mixture of gases with carbon monoxide and hydrogen gas at a first concentration.

In an embodiment, the pre-treatment unit 106 is a unit that is installed downstream to the source 104 and upstream with respect to the apparatus 108. The pre-treatment unit 106 increases humidity by adding a stream of water vapor into a stream of impure hydrogen fuel to increase the humidity thereof. In other words, the pre-treatment unit 106 may increase the humidity of the first mixture of gases to facilitate the oxidation of carbon monoxide.

In one example, the apparatus 108, as shown in FIG. 1, is placed downstream with respect to the pre-treatment unit 106. The apparatus 108 is placed in such a way that the apparatus 108 receives the first mixture of gases from the pre-treatment unit 106. In one example, the apparatus 108 includes the housing 118 that defines the body of the apparatus 108. In the illustrated example, the housing 118 is constructed as a single piece cylindrical tank. The housing 118, in another example, can be made using multiple cylindrical sections joined together using welding. The housing 118 may be coupled to the valves 116 that can receive pipes to allow ingress and egress of gases from the housing 118. The apparatus 108 may operate in two modes, namely adsorption mode and regeneration mode. In the adsorption mode, the apparatus 108 may adsorb carbon monoxide while in the regeneration mode, the apparatus 108 may oxidize the adsorbed carbon monoxide. Details of each mode are explained in subsequent embodiments.

The housing 118 includes the first chamber 120 and the second chamber 122 that together defines the volume of the housing 118. The first chamber 120, as shown in FIG. 1 may be defined as half-volume of the housing 118 while the second chamber 122 may define another half of the volume of the housing 118. The first chamber 120 may receive the first mixture of gases while the second chamber 122 may receive a second mixture of gases with hydrogen gas at the second concentration. In one example, the second concentration may be greater than the first concentration. In another example, the second concentration of hydrogen gas can be 99.9% by volume. In one implementation, the first chamber 120 and the second chamber 122 may be hermetically sealed from each other while in another implementation, the first chamber 120 and the second chamber 122 may be fluidically coupled to each other. Provision of first chamber 120 and the second chamber 122 within the housing 118 makes the apparatus 108 compact in size.

The first chamber 120 may include the electrode 126-1 while the second chamber 122 may include the other electrode 126-2, such that the electrodes 126-1, 126-2 may apply an electric potential therebetween. In one example, the electrodes 126-1, 126-2 may be connected to the electrical source 114 that may provide direct current (DC) to the electrodes 126-1, 126-2. Further, the electrode 126-1 may be a cathode and the other electrodes 126-2 may be an anode. The purpose and operation of the electrodes 126-1, 126-2 is explained in subsequent embodiments.

The first chamber 120 and the second chamber 122 are separated from each other by the solid-state electrolyte 124. In an embodiment, the solid-state electrolyte 124 includes a first surface 128 that faces the first chamber 120 and a second surface 130 that faces the second chamber 122. The solid-state electrolyte 124 is configured to perform two tasks. First, the solid-state electrolyte 124 adsorbs carbon monoxide from the first mixture of gases. In order to adsorb carbon monoxide in the first mixture of gases, the solid-state electrolyte 124 includes a carbon monoxide adsorbing catalyst like Pt, Ru, Rh, Ir, Au, Ag etc and/ or transition metals Mo, Cu, Ni, Mg, Co, Cr, Sn, W, among other examples, and any combination (bi/ternary) thereof.

In one example, the first surface 128 includes a coating of the carbon monoxide adsorbing catalyst while in another example, both the first surface 128 and the second surface 130 includes a coating of the carbon monoxide adsorbing catalyst. The carbon monoxide adsorbing catalyst can be activated by different techniques to adsorb carbon monoxide. In one such example, the carbon monoxide adsorbing catalyst can be activated by an electric potential. The carbon monoxide adsorbing catalyst is configured to preferably adsorb carbon monoxide. According to the present subject matter, the adsorption of carbon monoxide from the first mixture of gases results in the third mixture of gases with hydrogen at the third concentration, such that the third concentration is greater than the first concentration.

In an example, the buffer tank 110 is installed downstream with respect to the apparatus 108 and is in fluid communication with both the first chamber 120 and the second chamber 122. The buffer tank 110 is configured to store hydrogen gas exiting from the first chamber 120 as the third mixture of gases after carbon monoxide is adsorbed, and supply the hydrogen gas to the fuel cell stack 102. In addition, the buffer tank 110 is configured to receive hydrogen gas from the second chamber 122 as the second mixture of gases when the carbon monoxide adsorbing catalyst is regenerated. In either case, the buffer tank 110 is sized to accommodate the reduction in the supply of hydrogen gas from the first chamber 120 and increase in the supply of hydrogen gas from the second chamber 122 to ensure uninterrupted supply of hydrogen to the fuel cell stack 102. The buffer tank 110 may also be hermetically sealed similar to the first chamber 120 and the second chamber 122 to prevent leakage.

In an embodiment, the controller 112 may include, but is not limited to, a processor, memory, modules, and data. The modules and the memory may be coupled to the processor. The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions and data stored in the memory.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform particular tasks or implement data types. The modules may also be implemented as, signal processor(s), state machine(s), logic circuitries, and/or any other device or component that manipulate signals based on operational instructions.

Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the modules may be machine-readable instructions (software) which, when executed by a processor/processing unit, perform any of the described functionalities. Further, the data serves, amongst other things, as a repository for storing data processed, received, and generated by one or more of the modules.

In an embodiment, the controller 112 may be operably coupled (shown as dashed lines) to different components to execute the operation of the assembly 100. For instance, the controller 112 may operate the apparatus 108 to adsorb carbon monoxide and to oxidise the adsorbed carbon monoxide. The apparatus 108 may also control the valves 116 to control the flow of mixtures of gases within and outside the assembly 100. A manner by which the controller 112 operates is explained with respect to FIG. 3.

Referring now to FIGS. 1 and 2 combined, the apparatus 108 may include a plurality of inlet pipes and outlet pipes that are controlled by the valves 116. For instance, a first inlet pipe 202 couples the first chamber 120 (shown in FIG. 1) to the pre-treatment unit 106 (shown in FIG. 1) via a first valve 116-1 positioned upstream to the first chamber 120. Further, a first outlet pipe 204 couples the first chamber 120 to the buffer tank 110 via a second valve 116-2 positioned downstream to the first chamber 120 and upstream to the buffer tank 110. Furthermore, a second outlet pipe 206 couples the second chamber 122 (shown in FIG. 1) to the buffer tank 110 via a third valve 116-3 positioned downstream to the second chamber 122 and upstream to the buffer tank 110. Although not shown, a portion of the second outlet pipe 206 may extend through the first chamber 120. On the other hand, in order to discharge oxidised carbon monoxide, a third outlet pipe 208 couples the first chamber 120 to a ventilation structure through a fourth valve 116-4 positioned upstream to the first chamber 120. The apparatus 108 also includes a fourth outlet pipe 210 that couples the buffer tank 110 to the fuel cell stack 102 via a fifth valve 116-5 positioned downstream to the buffer tank 110. The assembly 100 may also include a sixth valve 116-6 (shown in FIG. 1) upstream to the pre-treatment unit 106 that regulates the flow of the impure hydrogen fuel to the pre-treatment unit 106. The valves 116 can be, but is not limited to, a solenoid valve.

Although not shown, the assembly 100 may include additional components that may facilitate the operation of the assembly 100. For instance, the assembly 100 may include a plurality of pressure pumps (not shown) that may maintain the pressure different components at a predefined value. For instance, pressure pumps may be used to maintain the pressure inside the first chamber 120 and the second chamber 122 at a value P1 while another pressure pump may maintain the pressure inside the buffer tank 110 at a value P2. Another pressure pump maintains the pressure inside the fuel cell stack 103 at a value P3, such that the relationship between P1, P2, and P3 may be: P1>P2>P3. Additional pressure pumps may be installed to maintain pressure inside the pre-treatment unit 106 at a value P5 such that P5>P1. The pressure difference is created to allow the flow of the gases. The aforementioned pressure pumps may also change the pressure values to modify the direction of flow gases.

Figure 3:
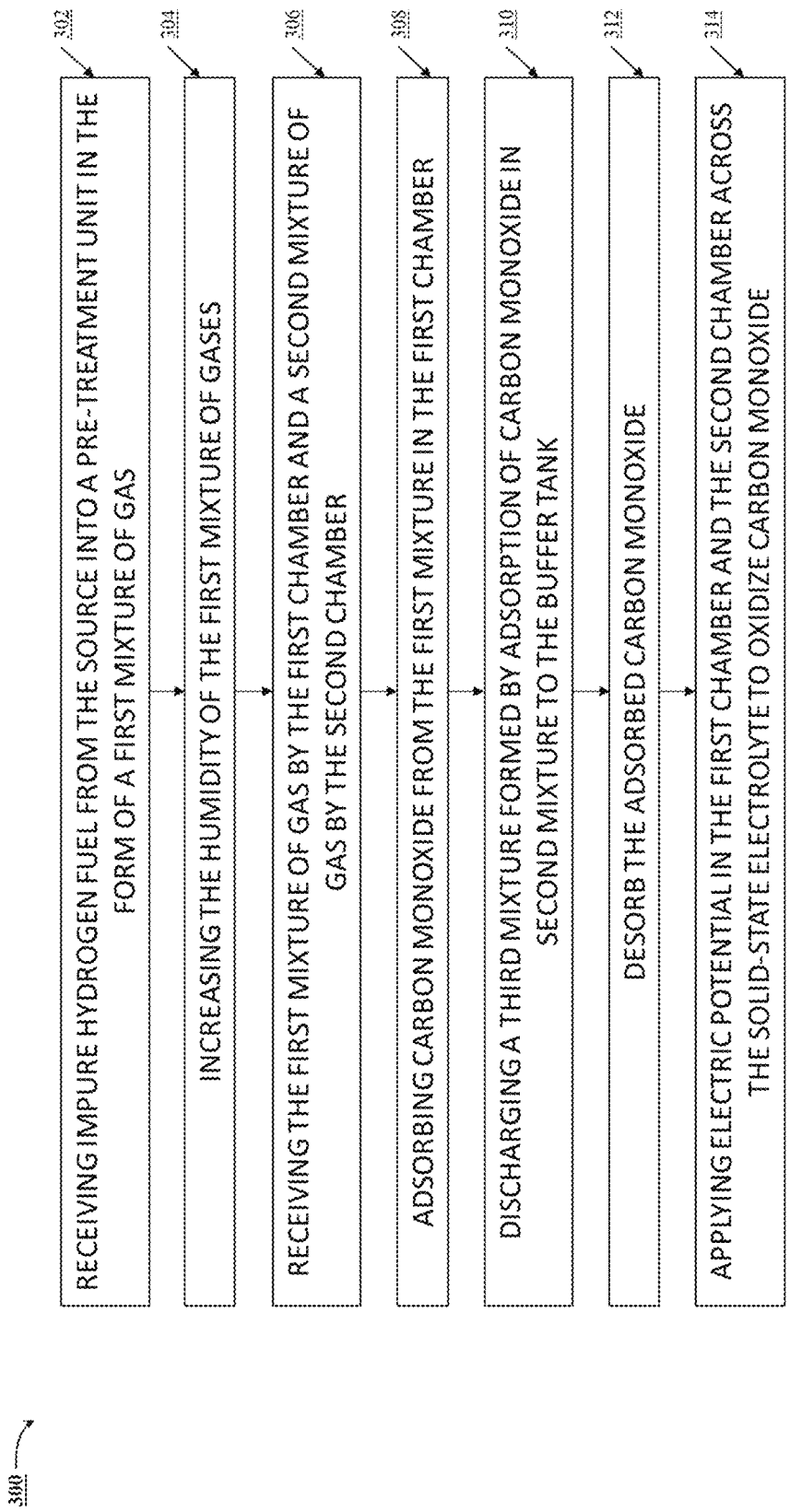
FIG. 3 illustrates a method of purifying impure hydrogen fuel, according to an embodiment of the present disclosure.

The operation of the assembly 100 and the apparatus 108 is now described with respect to a method 300 of FIG. 3 in conjunction with FIGS. 1 and 2. Specifically, FIG. 3 illustrates the method 300 for purifying impure hydrogen fuel. The order in which the method steps are described below is not intended to be construed as a limitation, and any number of the described method steps can be combined in any appropriate order to execute the method or an alternative method. Additionally, individual steps may be deleted from the method without departing from the spirit and scope of the subject matter described herein.

The method 300 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

In one example, the method 300 can be performed partially or completely by the assembly 100. The method begins at step 302, where the impure hydrogen fuel is received from the source 104 as the first mixture of gases. For instance, the controller 112 may activate the sixth valve 116-6 allowing pressurized impure hydrogen fuel from the source 104 to flow into the pre-treatment unit 106. Thereafter, at step 304, the humidity level of the impure hydrogen fuel may be increased. The controller 112 may actuate the pre-treatment unit 106 to add a stream of water vapour in the first mixture of gases. At step 306, the first mixture of gases is received by the first chamber 120. As mentioned before, the first mixture of gases includes carbon monoxide and hydrogen at the first concentration. The first chamber 120 may receive the first mixture of gases in different modes. In one mode, the first mixture of gases is received by the first chamber 120 as a continuous supply. In another mode, the first mixture of gases may be received as a batch of predefined volume released by the pre-treatment unit 106 at a predefined interval. Simultaneously, the second mixture of gases with hydrogen at the second concentration is received by second chamber 122. The second mixture of gases may be introduced using another inlet pipe (not shown) by the controller 112. In addition, the fifth valve 116-5 is also activated to provide residual hydrogen gas in the buffer tank 110 to the fuel cell stack 102.

The method 300 then proceeds to step 308 at which carbon monoxide in the first mixture of gases is adsorbed. In the illustrated step, the catalyst on the solid electrolyte adsorbs carbon monoxide thereby reducing the amount of carbon monoxide and increasing the relative concentration of hydrogen gas in the first chamber 120. Adsorption of carbon monoxide by the catalyst converts the first mixture of gases into the third mixture of gases with hydrogen at a third concentration. Due to the adsorption of carbon monoxide, the third concentration of hydrogen gas is greater than the first concentration. In one example, amount of carbon monoxide in the third mixture of gases after adsorption can be less than 100 parts per million (PPM) per unit volume of hydrogen gas. In another example, all of carbon monoxide may be adsorbed. While carbon monoxide is adsorbed, the solid-state electrolyte 124 separates the first chamber 120 from the second chamber 122. Moreover, humidity within the first chamber 120 remains constant during adsorption.

At step 310, the third mixture of gases is discharged to the buffer tank 110. In one example, the controller 112 activates the second valve 116-2 to allow the discharge of the second mixture of gases to the buffer tank 110. In one example, discharge of the third mixture of gases is caused by the difference in pressure P1 and P2 as stated above. Once the third mixture of gases is discharged to the buffer tank 110, method 300 proceeds at step 312 at which the adsorbed carbon monoxide is desorbed. The controller 112, in one example, may de-activate the first valve 116-1 and the second valve 116-2 thereby isolating the first chamber 120 from the pre-treatment unit 106 and the buffer tank 110. Thereafter, the controller 112 may actuate the catalyst on the solid-state electrolyte 124 to desorb carbon monoxide. In one such example, the controller 112 may operate the electrical source 114 to apply electrical potential on the electrodes 126-1, 126-2 resulting in a potential difference across the solid-state electrolyte 124. The resultant potential difference causes the catalyst to desorb and oxidise carbon monoxide.

Thereafter, at step 314, carbon monoxide is oxidised. In one example, the controller 112 may continue to apply electric potential on electrodes 126-1, and 126-2. The desorbed carbon to monoxide in presence of humidity may undergo oxidation as per following equation (1) due to electric potential applied on the electrodes 126-1, 126-2.

$$CO + H_2O \rightarrow CO_2 + 2H^+ \quad (1)$$

Moreover, hydrogen ion travels through the solid-state electrolyte 124 and gains electron from electrode 126-2 in the second chamber 122 resulting in the generation of hydrogen gas as per equation (2).

$$2H^+ + 2e^- \rightarrow H_2 \quad (2)$$

Accordingly, additional hydrogen gas is generated in the second chamber 122. The controller 112 may continue step 314 until all the carbon monoxide is oxidised to form a fourth mixture of gases in the first chamber 122. Finally, at step 316, additional hydrogen gas may be released to the buffer tank 110. In one example, the controller 112 may activate the third valve 116-3 to transfer the second mixture of gases from the second chamber 122 to the buffer tank 110. Thereafter, the controller 112 may activate the fourth valve 116-4 to regulate the discharge of the fourth mixture of gases from the first chamber 120. Once the oxidised carbon monoxide is removed, the controller 112 may deactivate the fourth valve 116-4 and reperform the steps as explained above. Meanwhile, the buffer tank 110 provides hydrogen gas at a predetermined rate to the fuel cell stack 102.

Figure 4:
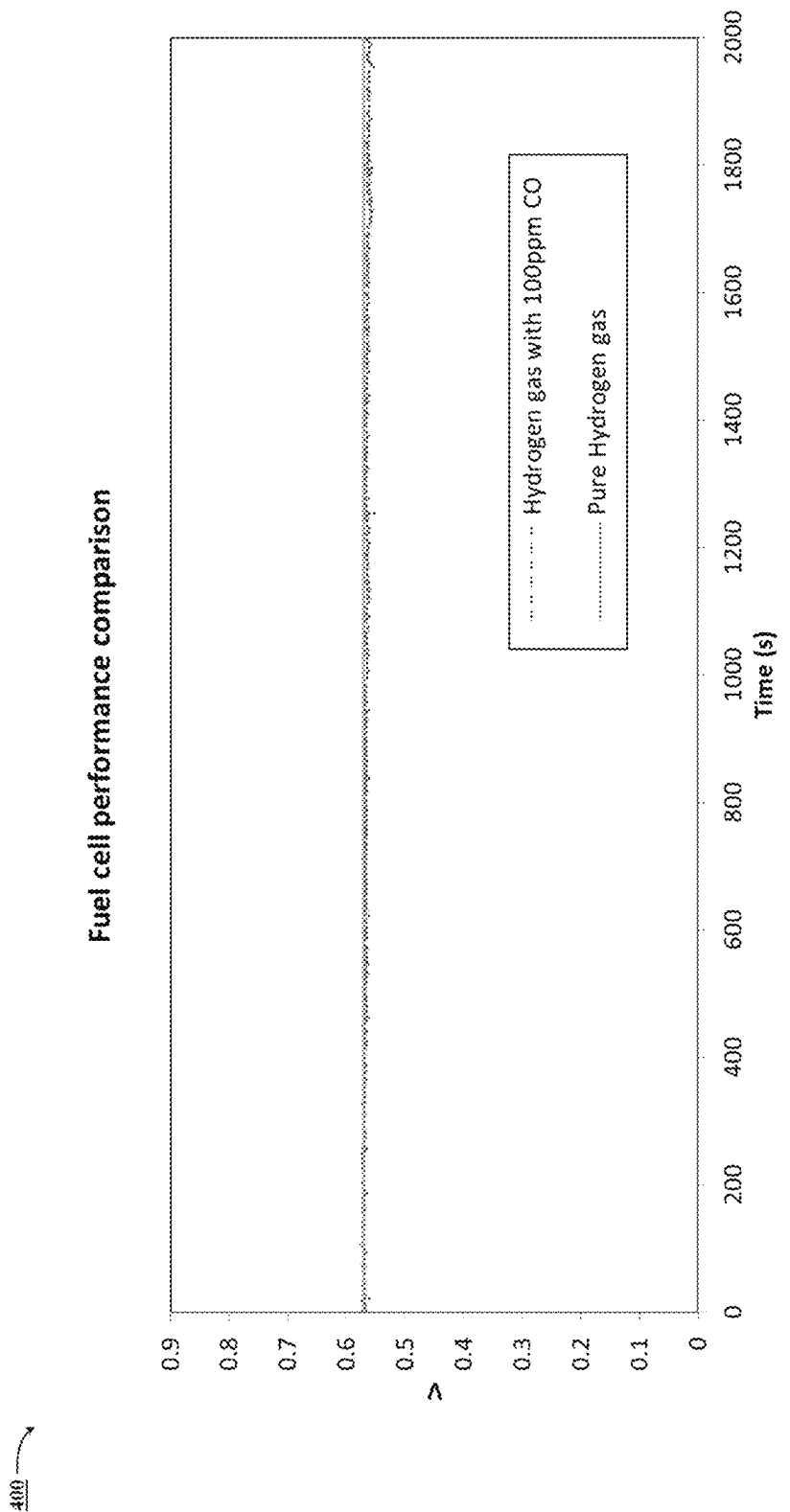
FIG. 4 illustrates a comparison between performance of a fuel cell with pure hydrogen gas and hydrogen gas provided by the apparatus, according to an embodiment of the present disclosure.

FIG. 4 illustrates a comparison between the performance of a fuel cell of the fuel cell stack 102 with pure hydrogen gas and hydrogen with 100 PPM carbon monoxide supplied by the apparatus 108. Graph 400 is plotted between voltage output of the fuel cell versus time. In the illustrated graph, the 'solid' curve or curve 1 indicates the pure hydrogen gas and the 'dotted' curve or curve 2 indicates hydrogen with 100 PPM carbon monoxide supplied by the apparatus 108. As clearly shown the voltage output of fuel cell in curve 1 remains between 0.6 and 0.5 as time elapse. Further, curve 2 is largely coincident with curve 1 as the time elapses indicating that the voltage output of the fuel cell with the hydrogen gas provided by the apparatus is equivalent as pure hydrogen supplied to the fuel cell. In other words, the cost-effective hydrogen gas provided by the apparatus 108 results in similar performance of the fuel cell when expensive purified hydrogen gas is provided to the fuel cell.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:
1. An assembly for purifying impure hydrogen fuel comprising:
 a pre-treatment unit;
 a source configured to supply a first mixture of gases with carbon monoxide and hydrogen gas to the pre-treatment unit;
 an apparatus including:
  a housing including a first chamber and a second chamber, wherein the first chamber is adapted to receive the first mixture of gases with carbon monoxide and hydrogen gas at a first concentration and the second chamber is adapted to receive a second mixture of gases with hydrogen gas at a second concentration;
  a solid-state electrolyte disposed inside the housing separating the first chamber and the second chamber, wherein the solid-state electrolyte includes a coating of carbon monoxide adsorption catalyst on a surface facing the first chamber; and
  a pair of electrodes disposed in each of the first chamber and the second chamber to generate a potential difference across the solid-state electrolyte; and
 a buffer tank placed downstream with respect to the apparatus and in fluid communication with the first chamber and the second chamber, wherein the buffer tank is adapted to:
  receive a third mixture of gases with hydrogen at a third concentration from the first chamber, wherein the third mixture of gases is formed by adsorption of carbon monoxide in the first mixture of gases by the coating, and
  receive the second mixture of gases with hydrogen at the second concentration from the second chamber;
 wherein the generated potential difference causes the carbon monoxide adsorption catalyst to desorb the adsorbed carbon monoxide on the coating in the first chamber thereby generating hydrogen in the second chamber, wherein the pre-treeatment unit is installed downstream to the source and upstream to the first chamber, and wherein the pre-treatment unit increases humidity in the first mixture of gases, and wherein the first chamber is adapted to discharge, a fourth mixture of gases including oxidised carbon monoxide, into a ventilation structure, wherein the fourth mixture of gases is discharged from the first chamber after generation of hydrogen in the second chamber.

2. The assembly as claimed in claim 1, wherein, the second concentration is greater than the first concentration, and the third concentration is greater than the first concentration.

3. The assembly as claimed in claim 2 comprising a plurality of valves, wherein, a first valve from amongst the plurality of valves is positioned upstream to the first chamber, a second valve from amongst the plurality of valves is positioned downstream to the first chamber and upstream to the buffer tank, a third valve from amongst the plurality of valves is positioned downstream to the second chamber and upstream to the buffer tank, a fourth valve from amongst the plurality of valves is positioned upstream to the first chamber, and a fifth valve from amongst the plurality of valves is positioned downstream to the buffer tank, wherein the first chamber is adapted to discharge the third mixture of gases with hydrogen at the third concentration to the buffer tank, and wherein the assembly comprises a controller adapted to isolate the first chamber from the pre-treatment unit and the buffer tank in response to the discharge of the third mixture of gases to the buffer tank, wherein to isolate the first chamber from the pre-treatment unit and the buffer tank, the controller is adapted to de-activate the first valve and the second valve.

4. The assembly as claimed in claim 3, wherein the fourth valve regulates the discharge of the fourth mixture of gases from the first chamber.

5. The assembly as claimed in claim 4, wherein the third mixture of gases is formed by adsorption of carbon monoxide in the first chamber and the fourth mixture of gases is formed by desorption of carbon monoxide in the first chamber.

6. The assembly as claimed in claim 1, wherein the catalyst is configured to adsorb carbon monoxide.

7. An apparatus comprising:

a housing including a first chamber and a second chamber, wherein the first chamber is adapted to receive from a source, a first mixture of gases with carbon monoxide and hydrogen gas at first concentration and the second chamber is adapted to receive a second mixture of gases with hydrogen at second concentration, wherein a pre-treatment unit is installed downstream to the source and upstream to the first chamber, wherein the pre-treatment unit increases humidity in the first mixture of gases, wherein the first chamber is adapted to discharge, a fourth mixture of gases including oxidised carbon monoxide, into a ventilation structure, wherein the fourth mixture of gases is discharged from the first chamber after generation of hydrogen in the second chamber;

a solid-state electrolyte disposed inside the housing separating the first chamber and the second chamber, wherein the solid-state electrolyte includes a coating of carbon monoxide adsorption catalyst on a surface facing the first chamber; and a pair of electrodes disposed in each of the first chamber and the second chamber to generate a potential difference across the solid-state electrolyte, wherein the generated potential difference causes the carbon monoxide adsorption catalyst to desorb adsorbed carbon monoxide on the coating in the first chamber thereby generating hydrogen in the second chamber.

8. A method comprising:

receiving from a source, a first mixture of gases with hydrogen and carbon monoxide at first concentration by a first chamber of a housing and increasing humidity of the first mixture of gases using a pre-treatment unit installed downstream to the source and upstream to the first chamber, and a second mixture of gases with hydrogen at second concentration by a second chamber of the housing;

adsorbing carbon monoxide from the first mixture of gases by a carbon monoxide adsorbing catalyst coated on a surface of a solid-state electrolyte, wherein the solid-state electrolyte separates the first chamber from the second chamber;

discharging a third mixture of gases with third conentration from the first chamber to a buffer tank, wherein the third mixture of gases is formed by adsorption of carbon monoxide in the first mixture of gases by the coating;

discharging a fourth mixture of gases from the first chamber formed after the generation of hydrogen in the second chamber;

desorbing the adsorbed carbon monoxide on the coating in the first chamber; and applying an electric potential by a pair of electrodes in the first chamber and the second chamber across the solid-state electrolyte and generating hydrogen in the second chamber.

* * * * *